May 19, 1931. E. A. BARBET 1,805,559
PROCESS FOR CONTINUOUS RECTIFICATION OF CRUDE METHYL ALCOHOL
Filed Dec. 22, 1925
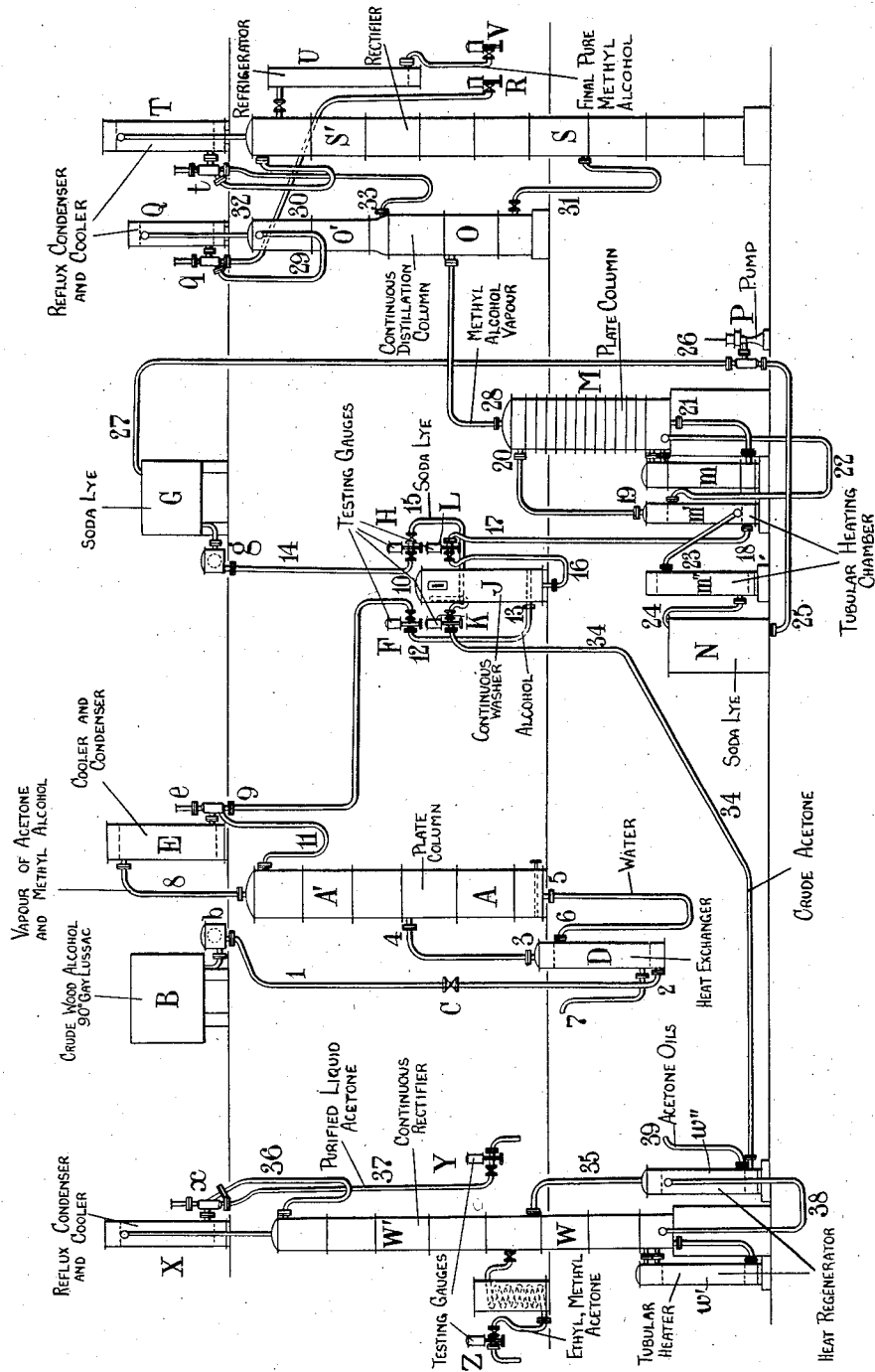

Patented May 19, 1931

1,805,559

UNITED STATES PATENT OFFICE

EMILE AUGUSTIN BARBET, OF PARIS, FRANCE

PROCESS FOR CONTINUOUS RECTIFICATION OF CRUDE METHYL ALCOHOL

Application filed December 22, 1925, Serial No. 77,080, and in France December 22, 1924.

The crude wood alcohol obtained in the carbonization of wood is a very complex mixture, the refining of which to obtain its principal components in a state of purity is a difficult and complicated process.

The object of the present invention is to provide an improved process for the treatment of crude wood alcohol.

The process according to the invention comprises essentially bringing the same at a high concentration and freed from tar in a continuous manner into contact with a stream of caustic alkaline lye in which the alcohol will dissolve and the acetone remain insoluble, permitting the aqueous material and the acetone to separate, and continuously and separately withdrawing the acetone and aqueous material in which alcohol is dissolved and subjecting the aqueous material to a continuous distillation process to recover the wood alcohol therefrom, continuously rectifying the wood alcohol thus recovered and subjecting the acetone to continuous distillation and rectification steps.

In the first place it is important that the crude wood alcohol treated shall be of high alcohol content, being at least 90° Gay Lussac and preferably even more concentrated.

If, therefore, the crude material to be treated is weaker than 90° Gay Lussac it should be first subjected to a preliminary concentration.

The invention will be described in detail with reference to the accompanying drawing, illustrating by way of example suitable apparatus for carrying the invention into effect.

The crude wood alcohol contained in the cistern B is delivered by way of the float regulator $b$ and the pipe 1 and at a rate regulated by means of the cock C through the inlet 2 into the heat exchanger D from which it passes through the pipe 3—4 into the plate column A—A'.

In the lower section A of this column materials less volatile than water are vaporized, the residual water passing by way of the inverted siphon 5—6 into heat exchanger D where the heat contained in the residual liquor is given up to the crude wood alcohol to be treated and from which the cooled residual water is discharged by way of the pipe 7.

The vapours of acetone and methyl alcohol are rectified in A', the rectified vapours passing by way of the pipe 8 into the cooler and condenser E.

The condensate passes out through the device $e$ and part of it is returned by way of the pipe 11 to the column A' in which it forms a reflux, the remainder being highly concentrated wood alcohol passes by way of the pipe 9—10 into the testing gauge F.

The rectified wood alcohol saturated with acetone is treated cold with caustic soda lye of strength between 28° and 30° Baumé and in which acetone is insoluble whereas methyl alcohol is soluble.

This operation can be effected by any suitable device adapted to bring the lye and wood alcohol into intimate contact but the operation is best carried out in a continuous washer as shown at J.

The washing in this device is effected by causing the alcohol and lye to flow in counter current, the alcohol entering at the bottom by way of the pipe 12—13 and the soda lye by way of the pipe 15. Intimate contact of the two liquids is secured in this device with the aid of suitable packing or filling, for instance crushed quartz or porcelain balls, with which the washer is charged.

The soda lye is introduced into the washer from the tank N, being drawn therefrom through the pipe 25 by the pump P and delivered through the pipe 26—27 into the upper cistern G fitted with a float regulator $g$. From this cistern the lye passes by way of the pipe 14 at a rate controlled by the testing gauge H and the pipe 15 into the washer J.

Under the influence of the lye, acetone rises in J and floats on the surface of the body of the lye in the upper part thereof. The acetone leaves by way of an internally arranged overflow and passes into the testing gauge K and thence to the acetone rectifier subsequently described.

The soda lye containing in solution the methyl alcohol is discharged from the base of J by way of the pipe 16 to the testing gauge L from which it passes by way of the pipe 17 to the distilling apparatus by which the methyl alcohol is separated from the soda lye.

The lye containing methyl alcohol in solution is delivered by the pipe 17 by way of the inlet 18 into a tubular heat interchanger $m'$ in which it is heated by the rectified or extracted lye delivered thereto by way of the inverted siphon 22 and after passing in series through the heat interchanger $m'$, the pipe 23 and heat interchanger $m''$ it is delivered to the tank N. The lye containing methyl alcohol preheated in the heat interchanger $m'$ passes by way of the pipe 19—20 into the top of the plate column M and descends therethrough in the usual way in which at the same time it is heated by means of heat supplied from $m$ to such a degree as will ensure that the regenerated lye is restored to its original concentration.

The methyl alcohol vapour from the column M passes by way of the pipe 28 to the continuous rectifier of a current type comprising a continuous distillation column OO' with a reflux condenser and cooler Q and a rectifier, properly so called, SS' with its reflux condenser and cooler T.

The most volatile fraction containing aldehyde, a small amount of acetone and methyl acetate is delivered by way of the pipe 30 to the testing gauge R. This product will normally be returned to the crude methyl alcohol in order that it may be again treated with soda lye.

The testing gauge V receives the pure and finally rectified methyl alcohol from the rectifier SS' previously cooled after it has passed through the refrigerator U.

With the apparatus described means (not shown) may be associated for the separation of allyl alcohol, acetone oil and the like.

The crude acetone passing through the testing gauge K is composed of light, medium and heavy elements and it is rectified in the continuous rectifier WW', passing thereto by way of the pipe 34 and through the heat regenerator $w''$ in which its temperature is raised by the heat contained in the residual water discharged from the base of W, the preheated acetone passing from the heat regenerator by way of the pipe 35 into the said rectifier. A reflux condenser and cooler X is associated with this rectifier adjacent to the base of which a tubular heater W' is provided. From the head of WW' the vapours of acetone are delivered to the cooler X from which by way of the pipe 7 the purified liquid acetone passes to the testing gauge Y, the ethyl methyl acetone passes out through the testing gauge Z and from the outlet of the recuperator the acetone oils pass out by way of the pipe 39.

In conclusion it may be mentioned that the soda lye used can be used repeatedly until it becomes saturated with sodium acetate formed by the decomposition of the acetic esters present in the crude wood alcohol when it can be treated for the recovery of sodium acetate or for the production of acetic acid.

Having now described my invention, what I claim as new and desire to secure by Letters Patent is:—

Process of obtaining purified methyl alcohol and purified acetone from crude methyl alcohol containing acetone by continuous treatment consisting in rectifying the crude methyl alcohol, condensing the emitted vapors, causing the condensate to flow in countercurrent to a stream of an aqueous solution of caustic alkali in which the methyl alcohol is dissolved while the acetone remains insoluble, separating the acetone from the caustic alkali of methyl alcohol, separating by continuous distillation the methyl alcohol from the caustic soda and rectifying the alcohol obtained for collecting on the one hand the pure methyl alcohol and on the other hand separating the products entrained therewith, the separated alkaline solution being again brought into contact with the crude methyl alcohol, the crude acetone separated from the crude methyl alcohol being submitted to a continuous rectification whereby it is possible to obtain the acetone in the state of purity, and separately recovering the products entrained therewith.

In testimony whereof I have signed my name to this specification.

EMILE AUGUSTIN BARBET.